US011296538B2

(12) United States Patent
Zugasti Hays et al.

(10) Patent No.: US 11,296,538 B2
(45) Date of Patent: Apr. 5, 2022

(54) ENERGY TRANSFER MECHANISM WITH PREDEFINED LIMIT

(71) Applicant: Lenovo (Singapore) Pte. Ltd., Singapore (SG)

(72) Inventors: Alfredo Zugasti Hays, Cary, NC (US); Axel Ramirez Flores, Durham, NC (US); Larry Glenn Estes, Durham, NC (US); Kenneth Scott Seethaler, Wake Forest, NC (US); Scott Wentao Li, Cary, NC (US); Russell Speight VanBlon, Raleigh, NC (US); Jennifer Greenwood Zawacki, Hillsborough, NC (US); Alan Ladd Painter, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/811,370

(22) Filed: Nov. 13, 2017

(65) Prior Publication Data

US 2018/0069415 A1    Mar. 8, 2018

Related U.S. Application Data

(63) Continuation of application No. 14/201,444, filed on Mar. 7, 2014, now abandoned.

(51) Int. Cl.
*H02J 7/00* (2006.01)
*H02J 7/34* (2006.01)
(Continued)

(52) U.S. Cl.
CPC ............... *H02J 7/342* (2020.01); *H02J 5/00* (2013.01); *H02J 7/0077* (2013.01); *H02J 7/02* (2013.01); *H02J 50/10* (2016.02); *H02J 50/80* (2016.02)

(58) Field of Classification Search
CPC ....... Y02E 60/12; H02J 7/0054; H02J 7/1423; H02J 50/80; H02J 50/10; H02J 5/00;
(Continued)

(56) References Cited

U.S. PATENT DOCUMENTS 5,619,118 A    4/1997  Reipur et al.
5,870,685 A *  2/1999  Flynn ................... H02J 7/0063
                                                    455/573

(Continued)

FOREIGN PATENT DOCUMENTS

CN    101442831 A      5/2009
EP     1986303 A1 * 10/2008  ............ H02J 7/0004
(Continued)

OTHER PUBLICATIONS

"U.S. Appl. No. 14/201,444, Advisory Action dated Jan. 26, 2017", 3 pgs.
(Continued)

*Primary Examiner* — Richard Isla
*Assistant Examiner* — Mohammed J Sharief
(74) *Attorney, Agent, or Firm* — Schwegman Lundberg & Woessner, P.A.

(57) ABSTRACT

A device and method of transferring energy between peer devices includes determining a predefined limit on energy transfer to a consumer device, initiating transfer of the energy via an energy transfer connection, and terminating the energy transfer when the predefined limit is reached.

19 Claims, 3 Drawing Sheets

(51) Int. Cl.
*H02J 7/02* (2016.01)
*H02J 50/80* (2016.01)
*H02J 50/10* (2016.01)
*H02J 5/00* (2016.01)

(58) Field of Classification Search
CPC .. H02J 7/007; H02J 7/02; H02J 7/025; H01M 10/44; H01M 10/46
USPC .......................................................... 320/103
See application file for complete search history.

(56) References Cited

U.S. PATENT DOCUMENTS

| | | | | |
|---|---|---|---|---|
| 6,112,191 | A * | 8/2000 | Burke | G06Q 20/04 235/375 |
| 6,222,347 | B1 * | 4/2001 | Gong | G06F 1/263 320/134 |
| 7,024,321 | B1 * | 4/2006 | Deninger | G01R 31/3648 320/113 |
| 2002/0128051 | A1 | 9/2002 | Liebenow | |
| 2006/0012339 | A1 * | 1/2006 | Lee | H02J 7/0071 320/125 |
| 2006/0121951 | A1 | 6/2006 | Perdomo et al. | |
| 2008/0269953 | A1 * | 10/2008 | Steels | H04L 12/10 700/295 |
| 2009/0153100 | A1 * | 6/2009 | Okumura | H02J 7/0026 320/116 |
| 2009/0313103 | A1 * | 12/2009 | Ambrosio | G06Q 30/0222 705/14.25 |
| 2010/0050275 | A1 | 2/2010 | Burch et al. | |
| 2010/0066311 | A1 * | 3/2010 | Bao | H02J 7/0071 320/162 |
| 2010/0085012 | A1 * | 4/2010 | Cruise | H01M 10/441 320/134 |
| 2010/0090644 | A1 * | 4/2010 | Nokkonen | G06F 1/26 320/107 |
| 2010/0205472 | A1 * | 8/2010 | Tupman | G06F 1/3203 713/340 |
| 2010/0225270 | A1 | 9/2010 | Jacobs et al. | |
| 2011/0016333 | A1 | 1/2011 | Scott et al. | |
| 2011/0018679 | A1 * | 1/2011 | Davis | H02J 50/12 340/3.1 |
| 2011/0127954 | A1 * | 6/2011 | Walley | H01M 50/116 320/108 |
| 2011/0181110 | A1 * | 7/2011 | Walley | H02J 7/008 307/31 |
| 2011/0244794 | A1 * | 10/2011 | Nakano | H02J 50/80 455/41.1 |
| 2012/0173074 | A1 * | 7/2012 | Yasko | B60L 53/62 701/31.5 |
| 2012/0280653 | A1 | 11/2012 | Prosser et al. | |
| 2013/0013201 | A1 | 5/2013 | Winger et al. | |
| 2013/0134923 | A1 * | 5/2013 | Smith | H02J 50/10 320/103 |
| 2013/0281013 | A1 | 10/2013 | Hillan | |
| 2013/0281155 | A1 * | 10/2013 | Ogata | H02J 7/025 455/556.1 |
| 2014/0035380 | A1 * | 2/2014 | Stevens | H02J 50/80 307/104 |
| 2014/0152235 | A1 | 6/2014 | Huang et al. | |
| 2014/0184156 | A1 * | 7/2014 | Sutardja | B60L 11/1824 320/109 |
| 2014/0217828 | A1 * | 8/2014 | Tanaka | H02J 50/80 307/104 |
| 2014/0225560 | A1 | 8/2014 | Walley et al. | |
| 2014/0253049 | A1 | 9/2014 | Iwamoto | |
| 2014/0299372 | A1 * | 10/2014 | Meazell | H01M 10/441 174/74 R |
| 2015/0065037 | A1 | 3/2015 | Burrell et al. | |
| 2015/0123602 | A1 | 5/2015 | Patino et al. | |
| 2015/0256017 | A1 | 9/2015 | Hays et al. | |

FOREIGN PATENT DOCUMENTS

| | | | | |
|---|---|---|---|---|
| EP | 1986303 A1 | 10/2008 | | |
| FR | 1986303 A1 | * 10/2008 | | H02J 7/0004 |

OTHER PUBLICATIONS

"U.S. Appl. No. 14/201,444, Advisory Action dated May 6, 2016", 3 pgs.

"U.S. Appl. No. 14/201,444, Advisory Action dated Oct. 16, 2017", 3 pgs.

"U.S. Appl. No. 14/201,444, Final Office Action dated Feb. 8, 2016", 24 pgs.

"U.S. Appl. No. 14/201,444, Final Office Action dated Aug. 11, 2017", 29 pgs.

"U.S. Appl. No. 14/201,444, Final Office Action dated Nov. 18, 2016", 25 pgs.

"U.S. Appl. No. 14/201,444, Non Final Office Action dated Apr. 10, 2017", 26 pgs.

"U.S. Appl. No. 14/201,444, Non Final Office Action dated May 19, 2016", 25 pgs.

"U.S. Appl. No. 14/201,444, Non Final Office Action dated Jul. 23, 2015", 21 pgs.

"U.S. Appl. No. 14/201,444, Response filed Jan. 6, 2017 to Final Office Action dated Nov. 18, 2016", 11 pgs.

"U.S. Appl. No. 14/201,444, Response filed Apr. 8, 2016 to Final Office Action dated Feb. 8, 2016", 9 pgs.

"U.S. Appl. No. 14/201,444, Response filed May 8, 2017 to Non Final Office Action dated Apr. 10, 2017", 10 pgs.

"U.S. Appl. No. 14/201,444, Response filed Aug. 19, 2016 to Non Final Office Action dated May 19, 2016", 9 pgs.

"U.S. Appl. No. 14/201,444, Response filed Sep. 18, 2017 to Final Office Actio dated Aug. 11, 2017", 11 pgs.

"U.S. Appl. No. 14/201,444, Response filed Oct. 22, 2015 to Non Final Office Action dated Jul. 23, 2015", 9 pgs.

* cited by examiner

ENERGY TRANSFER MECHANISM WITH PREDEFINED LIMIT

BACKGROUND

In times of need, such as in an emergency or when in remote areas with no power, users with a low battery or no battery left on their device require a mechanism quickly charge their device to make an emergency call, as an example. Smart devices are ubiquitous amongst users. Integrated batteries in smart devices can be charged, but do not carry the mechanism to charge other same-powered devices nor a method for the user to define or meter the energy transmission between devices.

Some devices allow for swapping batteries but incongruent batteries from different type of devices cannot be shared across devices. Some devices include a USB powered port to charge other low-powered smart devices, but do not allow charging of same-powered devices. External battery packs, solar power panels, other solutions exist but are cumbersome and become an additional accessory to carry.

SUMMARY

A device and method of transferring energy between peer devices includes determining an amount of energy to transfer from a provider battery powered peer device to a consumer battery powered peer device, selecting an energy transfer connection between the provider device and the consumer device, and initiating transfer of energy via the energy transfer connection.

A machine readable storage device having instructions for execution by a processor of the machine to perform determining an amount of energy to transfer from a provider battery powered peer device to a consumer battery powered peer device, selecting an energy transfer connection between the provider device and the consumer device, and initiating transfer of energy via the energy transfer connection.

A device includes power management electronics configured to determine an amount of energy to transfer from a provider battery powered peer device to a consumer battery powered peer device, select an energy transfer connection between the provider device and the consumer device, and initiate transfer of energy via the energy transfer connection.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Energy transfer is performed between two mobile devices. In some embodiments, peer to peer energy transfer is performed between two smart devices, such as mobile phones. A peer device is a battery powered mobile device. Peers need not be the same model or type of device. For example, a laptop computer may send or receive power from a smartphone, tablet, or another laptop computer. Each of these peer devices may either receive or send power to any of the other types of peer devices. In various embodiments, devices may be capable of being both a provider and a receiver, or may have only one of such capabilities, yet still be termed a peer device.

One peer device transmits energy, and another peer device receives a negotiated amount of energy via existing charging technologies, such as inductive power, wireless power, and direct power cable, among others. The energy transfer may be controlled by a switch that changes the smart device from receiver to transmitter of energy to charge another device when activated.

Figure 1:
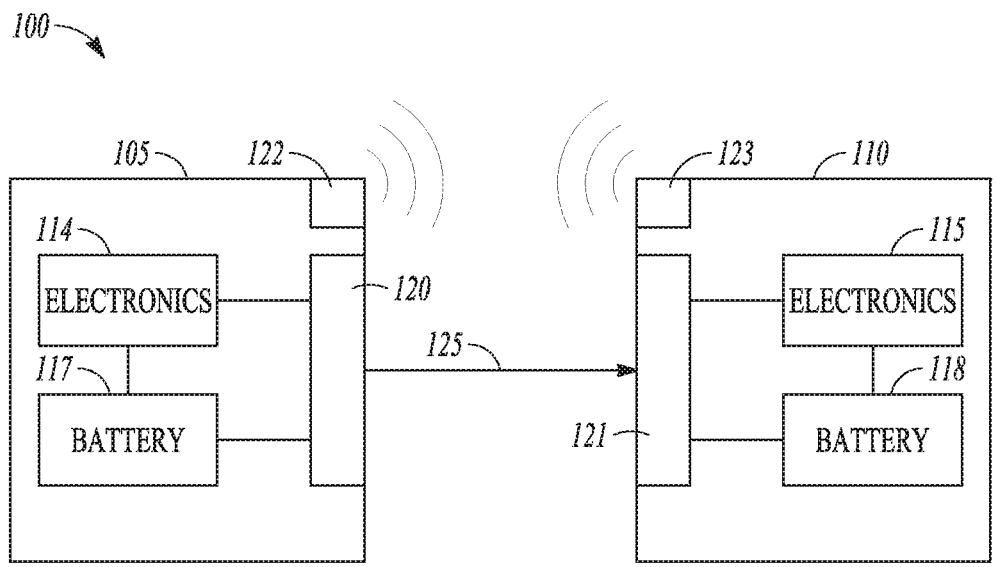
FIG. 1 is a block diagram illustrating a provider device transferring energy to a consumer device according to an example embodiment.

FIG. 1 is a block diagram of two example peer devices 100 and 110. One of the peer devices will be a provider device, and the other, a consumer device. An energy transfer mechanism within each peer device may include a power manager 114, 115 respectively, such as a power management utility, that controls which device to transmit energy to, how to transmit the energy, and a duration of the energy transmission. The power manager 114, 115 may allow a user to control the device transferring energy to meter and to measure the energy transmission between devices. Measuring or metering the energy transfer facilitates use of a payment or credit system for receiving value for transferred energy.

In one embodiment, the power manager 114, 115 is formed of electronics, which may be a microprocessor running a computer program stored on a memory device. The power manager 114, 115 is powered by a battery 117, 118 respectively. An energy transfer mechanism 120, 121 is coupled to the battery 117, 118 and may be controlled by power manager 114, 115, and may implement many different types of energy transfer constructs, such as a wired connection—USB cable, for example, or wireless power transfer such as Qi or PMA (Power Matters Alliance) inductive charging, or A4WP Electromagnetic Charging.

The energy transfer mechanism 120, 121 may thus be a USB port, or a coil for transfer to another coil. The energy transfer is represented at a connection 125, and may consist of a wireless or wired connection suitable for transferring power. In the case of wireless transfer when mechanisms 120, 121 are electromagnetic coils, connection 125 may represent that the devices 100 and 110 are brought in close proximity to each other suitable for inductively transferring power between the coils. In the case of a USB type of power transfer, connection 125 represent a USB cable. Connection 125 may also represent other forms of connection between two devices to exchange power in further embodiments.

In a further embodiment, the devices may include transceivers 122, 123 coupled to the power manager electronics to provide communication between the devices. The communications may include information exchanged to agree upon roles in an energy transfer, the amount of energy to be transferred, the method of transfer, power metering and measurement information, value to be exchanged, and other information to facilitate starting and stopping of the energy transfer.

Figure 2:
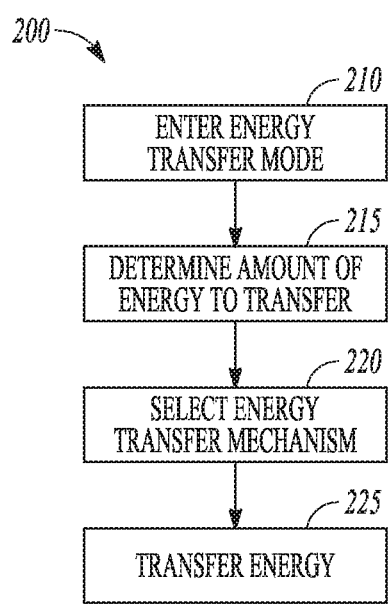
FIG. 2 is a flowchart illustrating a method of transferring power from a provider device to a peer device according to an example embodiment.

FIG. 2 is a flowchart illustrating a method 200 implemented by one peer device transferring power, a provider device, to another peer device, a consumer device. At 210, the provider device enters into an energy transfer mode, and determines a specific quantity or amount of energy to transfer at 215 to the consumer device. At 220, an energy transfer mechanism is selected, such as a wired, or a close proximity inductive charge transfer between coils in the respective devices.

The amount of energy to be transferred at 225 may be controlled in various manners. A selected amount of energy, such as a value expressed as watt hours may be specified in one embodiment with the magnitude of energy being transferred varying, resulting in transfers of varying times. A constant amount of energy for a fixed amount of time may be transferred in a further embodiment. In another embodiment, energy transfer may take place until a specified amount of energy remains in the provider device, such as 50% of the battery power remaining. In still further embodiments, a provider device may transfer a fixed percentage of a full charge, such as 20% of a full charge. Each of the transfers may also have a time limit associated with them, so that charging stops after a specified amount of time, such as 15 minutes regardless of whether the transfer is complete or not.

In one embodiment, the power being transferred is metered by the transfer mechanism 120 of the provider device. The provider device may also track the time during the power transfer to effect one of the above transfer methods. The data may be provided to the power manager 114 of the provider device, which may also track the time internally or via a separate clock. When device 110 is the receiver device, its transfer mechanism 121 may measure the power received to ensure that any negotiated transfer has actually occurred and whether any negotiated value exchange should occur. Note that the measured power is likely less than the metered power, as some losses occur in the transfer mechanism utilized. In one embodiment, the transfer mechanism and estimated transfer efficiency may be considered in determine any value to be exchanged.

A speed of energy transfer may depend upon respective capabilities of provider and consumer devices, and amount to be transferred. In one example, a first user's smartphone battery is at 80% charge, but a second user's smartphone battery is dead. The second user may have no charger/access to ac power. The first user may agree to transfer up to 20% of battery energy to the second user's phone. The first user may set limits of: transfer amount: 20% max, transfer time: 15 minutes max. The phones are then connected (by wire) or placed in proximity (wireless charging) and the energy transfer is initiated by providing energy from the provider battery to the energy transfer cable, electromagnetic coil, or other wireless energy transfer mechanism. For Qi/PMA connecting the phones means placing phones back to back on a table, for example. There may be no need for a user to monitor the energy transfer, as the provider phone controls the transfer automatically. The provide phone stops the transfer when the transfer amount (20%) or time limit (15 minutes) is reached. In one embodiment, the power manager of the provider phone may simply control a port being used for the transfer to stop the transfer.

Figure 3:
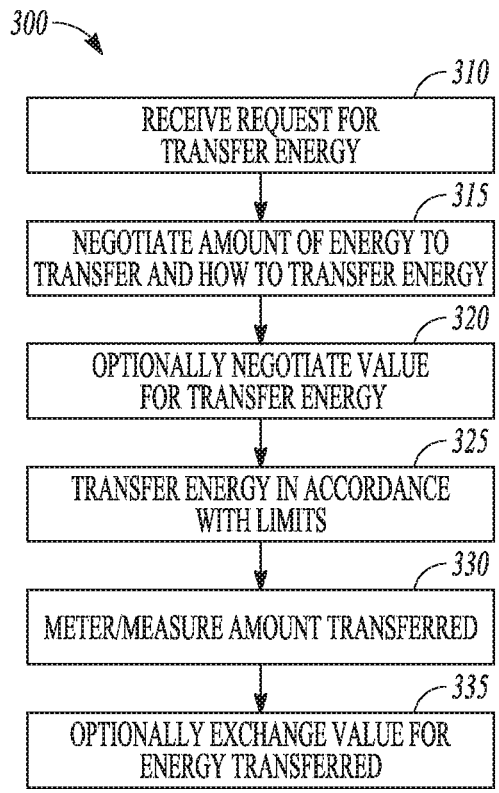
FIG. 3 is a flowchart illustrating a method of negotiating a power transfer between peer devices according to an example embodiment.

FIG. 3 is a flowchart illustrating a method 300 of negotiating a power transfer. At 310, a request is received for energy transfer. The request may be received by a user of the device in one embodiment or via a communication from a potential receiver received by a provider device utilizing transceivers 122, 123. At 315, an amount of energy to transfer may be negotiated. The negotiation may be directed by a user of a device and may consist of exchanging numbers representative of total power, length of time for the transfer, or percentage of power to transfer as previously referenced. The mechanism for power transfer may also be negotiated, such as wired or wireless connection. This may depend on the capabilities of the respective devices.

A value to be transferred in exchange for the power transfer may optionally be negotiated at 320. The value may consist of a credit for future power transfers back, a monetary value to be provided in cash or credit, or any other type of value users may agree upon. The transfer then takes place at 325. At 330, the amount of energy that is transferred is metered by the provider and may also be measured by the receiver. The value may be correlated to either amount, or both, such as an average of the two depending on the previous negotiation. At 335, an optional exchange of value for the energy transferred may be performed as agreed upon.

Figure 4:
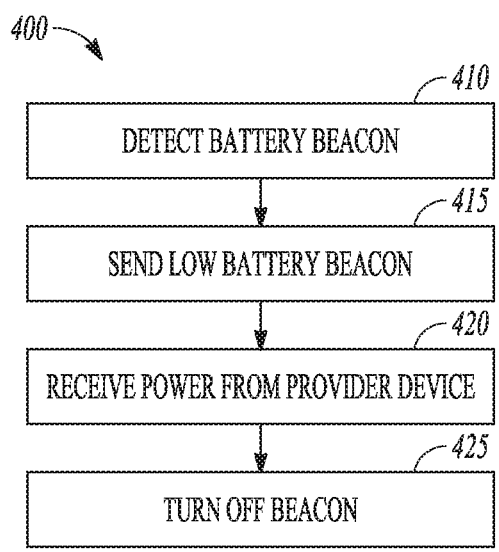
FIG. 4 is a flowchart illustrating a method of initiating a power transfer according to an example embodiment.

FIG. 4 is a flowchart illustrating a method 400 of initiating a power transfer. At 410, and device detects that its battery is low, and that charging is needed. The detection may be based on a percentage charge remaining threshold, such as 10%, a projected time remaining threshold, or other measurable parameter having threshold corresponding to when recharging should take place to continue operation of the device. A device detecting low power in this manner becomes a consumer device, and may use it's transceiver to send out a low batter signal or beacon at 415 detectable by a potential provider device. Power may then be received from a provider at 420, or from another device such as a standard AC charger. When sufficient power is received, or when a power transfer is initiated, the consumer device may turn off the beacon at 425. Sufficient power may be identified using the same threshold used to determine low power, or a higher threshold may be used in further embodiments to ensure some operating time prior to reaching the a low power state again.

Figure 5:
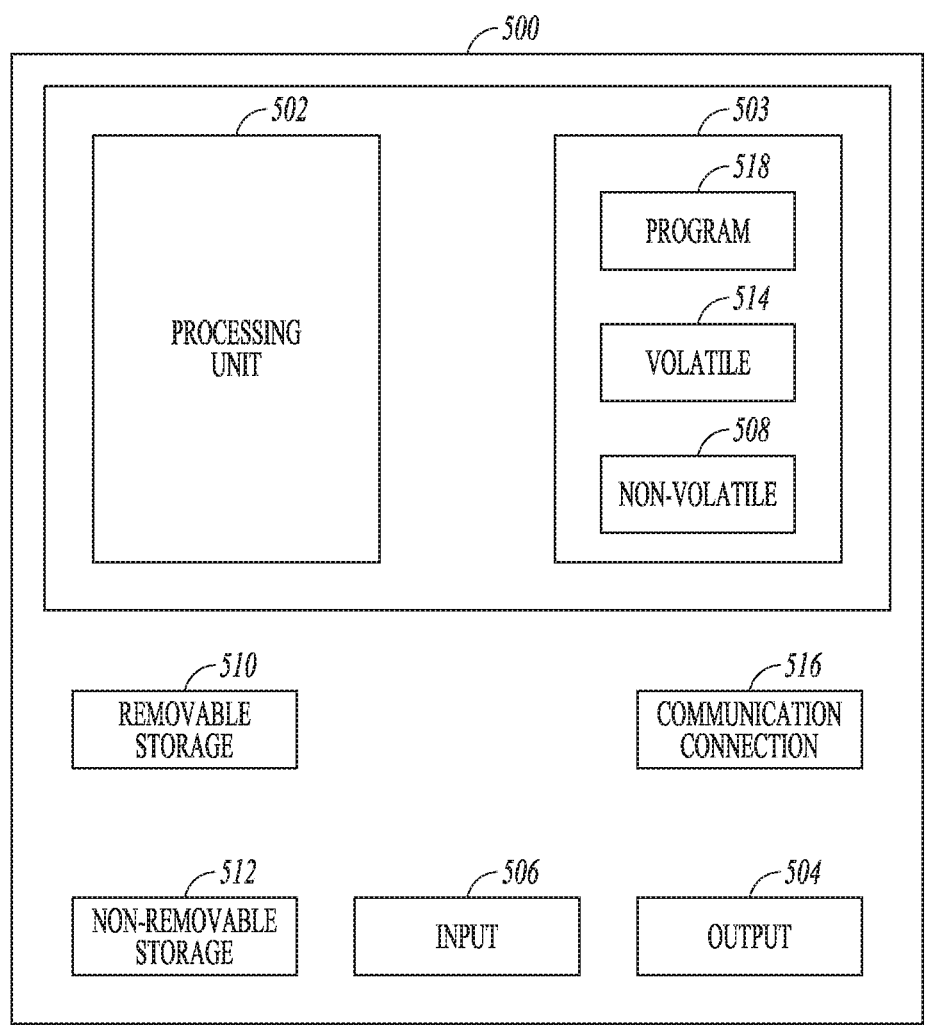
FIG. 5 is a block diagram of computer system used to implement methods according to an example embodiment.

FIG. 5 is a block schematic diagram of a computer system 500 to implement device 100 and other computing resources according to example embodiments. All components need not be used in various embodiments. One example computing device in the form of a computer 500, may include a processing unit 502, memory 503, removable storage 510, and non-removable storage 512. Sensors 115 and 125 may be coupled to provide data to the processing unit 502. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. Output 504 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

Examples

1. A method of transferring energy between peer devices, the method comprising:
determining an amount of energy to transfer from a provider battery powered peer device to a consumer battery powered peer device;
selecting an energy transfer connection between the provider device and the consumer device; and
initiating transfer of energy via the energy transfer connection.

2. The method of example 1 wherein the amount of energy to transfer is a percentage of battery power of the provider device.

3. The method of any of examples 1-2 wherein initiating transfer of energy comprises:
transferring energy via the energy transfer connection; and
metering the amount of energy transferred.

4. The method of example 3 and further comprising stopping the energy transfer when the determined amount of energy has been transferred as indicated by the metering of the amount of energy transferred.

5. The method of any of examples 3-4 and further comprising stopping the energy transfer when a remaining battery power in the provider device reaches a stop transfer threshold.

6. The method of any of examples 3-5 and further comprising stopping the energy transfer when an energy transfer time period has been reached regardless of the amount of energy transferred.

7. The method of any of examples 1-6 and further comprising:
negotiating a value for a negotiated amount of energy to be transferred; and
receiving the negotiated value in exchange for the transferred energy.

8. The method of any of examples 1-7 wherein initiating transfer of energy comprises providing energy to the consumer device via a cable.

9. The method of any of examples 1-7 wherein initiating transfer of energy comprises providing energy to the consumer device via electromagnetically coupled electromagnetic coils.

10. A machine readable storage device having instructions for execution by a processor of the machine to perform:
determining an amount of energy to transfer from a provider battery powered peer device to a consumer battery powered peer device;
selecting an energy transfer connection between the provider device and the consumer device; and
initiating transfer of energy via the energy transfer connection.

11. The machine readable storage device of example 10 wherein initiating transfer of energy comprises:
causing transfer of energy via the energy transfer connection; and
receiving metering information specifying the amount of energy transferred.

12. The machine readable storage device of example 11 wherein the machine further performs stopping the energy transfer when the determined amount of energy has been transferred as indicated by the metering of the amount of energy transferred.

13. The machine readable storage device of any of examples 11-12 wherein the machine further performs stopping the energy transfer when a remaining battery power in the provider device reaches a stop transfer threshold or when an energy transfer time period has been reached regardless of the amount of energy transferred.

14. The machine readable storage device of any of examples 10-13 wherein the machine further performs:
negotiating a value for a negotiated amount of energy to be transferred; and
receiving the negotiated value in exchange for the transferred energy.

15. The machine readable storage device of any of examples 10-14 wherein initiating transfer of energy comprises plugging in a cable over which to transfer the energy or placing the provider device in close proximity to the consumer device to effect energy transfer via electromagnetic coils.

16. A device comprising:
a display;
a processor operatively coupled to the display;
an energy transfer connection;
a battery which supplies power to the process and which is operatively coupled to the energy transfer connection; and
power management electronics configured to:
determine an amount of energy to transfer from a provider battery powered peer device to a consumer battery powered peer device;
select an energy transfer connection between the provider device and the consumer device; and initiate transfer of energy via the energy transfer connection.

17. The device of example 16 and further comprising an electromagnetic coil coupled to the power management electronics to transfer energy to the consumer device when selected as the energy transfer connection.

18. The device of any of examples 16-17 and further comprising a battery to provide the energy to be transferred.

19. The device of example 18 and further comprising a transceiver coupled to the power management electronics to exchange information with a peer device.

20. The device of example 19 wherein the battery comprises a low battery detector and wherein the power management electronics uses the transceiver to transmit a low battery power beacon responsive to the low battery detector.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   determining at a provider device a predefined limit on energy transfer to a consumer device, wherein the provider device and the consumer device are separate mobile user devices;
   initiating transfer of the energy from the provider device to the consumer device via an energy transfer connection;
   terminating the transfer of the energy by the provider device when the predefined limit is reached;
   determining at the provider device the predefined limit responsive to determining that e consumer device has a dead battery or the consumer device has a low battery; and
   determining a value to be exchanged between the provider device and the consumer device based on one or more of the energy transfer connection and an estimated transfer efficiency, wherein the value comprises a credit for future power transfers back and a monetary value.

2. The method of claim 1, further comprising receiving a selection of the predefined limit from a user of the provider device, wherein the predefined limit is negotiated by the user of the provider device and a user of the consumer device.

3. The method of claim 1, wherein the predefined limit includes an amount of time.

4. The method of claim 1, wherein the predefined limit comprises a portion of a charge of a provider device battery.

5. The method of claim 4, wherein the portion of the charge of the provider device battery is a percentage of charge of the provider device battery.

6. The method of claim 1, comprising stopping the energy transfer when a remaining battery power in the provider device reaches a stop transfer threshold or when an energy transfer time period has been reached regardless of the amount of energy transferred.

7. The method of claim 1, further comprising determining a credit for a future power transfer to the provider device.

8. A device comprising:
   a display;
   a processor operatively coupled to the display;
   an energy transfer connection;
   a battery that supplies power to the processor and that is operatively coupled to the energy transfer connection; and
   power management electronics configured to:
      permit a provider device and a consumer device to communicate to determine roles in a transfer of energy, wherein the roles comprise a transferor of the energy and a receiver of the energy, a method of the transfer of energy, power metering and measurement mechanisms involved in the transfer of energy, and a value to be exchanged for the transfer of energy;
      determine at the provider device a predefined limit on the transfer of energy to the consumer device based on an amount of energy remaining in the provider device, wherein the provider device and the consumer device are separate mobile user devices;
      initiate the transfer of energy from the provider device to the consumer device via an energy transfer connection;
      terminate the transfer of energy by the provider device when the predefined limit is reached; and
      determine a credit for a future power transfer to the provider device.

9. The device of claim 8, wherein the power management electronics are configured to determine the predefined limit responsive to determining that the consumer device has a dead battery or the consumer device has a low battery.

10. The device of claim 8, wherein the power management electronics are configured to receive a selection of the predefined limit from a user of the provider device.

11. The device of claim 8, wherein the predefined limit includes an amount of time.

12. The device of claim 8, wherein the predefined limit comprises a portion of a charge of a provider battery.

13. The device of claim 12, wherein the portion of the charge of the provider battery is a percentage of charge of the provider battery.

14. A non-transitory machine readable storage device having instructions for execution by a processor of the machine to perform:
   determining at a provider device a predefined limit on energy transfer to a consumer device, wherein the provider device and the consumer device are separate mobile user communication devices;
   receiving at the provider device a low battery signal from the consumer device;
   initiating transfer of energy from the provider device to the consumer device via an energy transfer connection;
   terminating the transfer of energy by the provider device when the predefined limit is reached; and
   receiving metering information at the provider device specifying an amount of energy transferred;
   wherein the provider device and the consumer device negotiate a length of time for the transfer of energy and a mechanism for the transfer of energy.

15. The non-transitory machine readable storage device of claim 14 wherein initiating the transfer of energy comprises:
   causing the transfer of energy via the energy transfer connection.

16. The non-transitory machine readable storage device of claim 15 including instructions to stop the transfer of energy when the transfer of energy reaches the predefined limit as indicated by the metering of the amount of energy transferred.

17. The non-transitory machine readable storage device of claim 15 including instructions to stop the transfer of energy when a remaining battery power in the provider device reaches a stop transfer threshold or when an energy transfer time period has been reached regardless of the amount of energy transferred.

18. The non-transitory machine readable storage device of claim 14, wherein the predefined limit comprises a portion of a charge of a provider battery.

19. The non-transitory machine readable storage device of claim 14, comprising instructions to receive a selection of the predefined limit from a user of the consumer device.

* * * * *